United States Patent [19]
Sekiguchi et al.

[11] Patent Number: 5,182,755
[45] Date of Patent: Jan. 26, 1993

[54] MALFUNCTION CHECKING SYSTEM FOR CONTROLLER

[75] Inventors: Akira Sekiguchi; Masao Nakajima; Kazumasa Kurihara; Kenji Arai, all of Higashimatsuyama, Japan

[73] Assignee: Diesel Kiki Co., Ltd., Tokyo, Japan

[21] Appl. No.: 201,962

[22] Filed: Jun. 3, 1988

[30] Foreign Application Priority Data

Jun. 19, 1987 [JP] Japan .................................. 62-151456
Jul. 14, 1987 [JP] Japan .................................. 62-173877

[51] Int. Cl.$^5$ ............................................ G06F 11/00
[52] U.S. Cl. ................................. 371/16.3; 364/186
[58] Field of Search ........... 364/183, 184, 186, 431.11, 364/580; 371/57, 70, 16.3, 25.1, 57.1, 62, 15.1

[56] References Cited

U.S. PATENT DOCUMENTS

| | | | |
|---|---|---|---|
| 4,245,309 | 1/1981 | Kiefer | 364/186 X |
| 4,339,801 | 7/1982 | Hosaka et al. | 364/431.04 |
| 4,351,013 | 9/1982 | Matsko et al. | 361/96 |
| 4,455,653 | 6/1984 | Le Gars et al. | 371/20 |
| 4,580,220 | 4/1986 | Braun et al. | 364/431.11 |
| 4,598,355 | 8/1986 | Shepler et al. | 364/186 X |
| 4,628,443 | 12/1986 | Rickard et al. | 364/186 X |
| 4,629,907 | 12/1986 | Kosak | 307/265 |
| 4,634,842 | 1/1987 | Payne | 340/644 X |
| 4,685,053 | 8/1987 | Hatori et al. | 364/184 |

FOREIGN PATENT DOCUMENTS 2949934 7/1980 Fed. Rep. of Germany.
3114550 2/1982 Fed. Rep. of Germany.
85/02694 6/1985 PCT Int'l Appl..

Primary Examiner—Stephen M. Baker

[57] ABSTRACT

A system for checking a malfunction in a controller. The controller includes a microcomputer connected between an input and output terminal of the controller. The microcomputer is programmed to perform a normal control mode, to perform a self-checking mode, and to judge whether conditions of entry into the self-checking mode are met so as to select one of the two modes. An external circuit is connected between the input and output terminals of the controller so as to establish a predetermined relation between the voltage levels of the input and output terminals. In the self-checking mode, the microcomputer outputs a control signal for setting the output terminal to one of high and low logic voltage levels. The microcomputer judges whether an input signal passed to the microcomputer through the input terminal having the predetermined voltage relation with said output terminal has a voltage level corresponding to the voltage level of said output terminal, and judges that there is a malfunction if the input signal is not at the above-mentioned corresponding level. The microcomputer causes the malfunction to be displayed in an external display unit when the microcomputer judges the malfunction.

11 Claims, 8 Drawing Sheets

MALFUNCTION CHECKING SYSTEM FOR CONTROLLER

BACKGROUND OF THE INVENTION

1. Field of the Invention

This invention relates to a system for checking a malfunction of a controller equipped with a microcomputer.

2. Prior Art

A controller used, for example, for controlling a fuel injection in a diesel engine is equipped with a microcomputer and discrete components. Prior to the shipment of such a controller, the controller is checked to judge whether the electrical connection between the microcomputer and the discrete components is proper and to judge whether the microcomputer and the discrete components operate properly. Conventionally, these checkings are carried out, using a program for the normal control of the microcomputer. With this method, however, the inputting and outputting conditions of the controller are checked, simulating the normal control operation, so that much time and labor are required for checking a malfunction.

Controllers for air conditioners, disclosed in Japanese Laid-Open (Kokai) Patent Application Nos. 57-13517, 57-13518, 57-13519 and 57-13520, include a mode switch connected to a microcomputer. Besides the normal control mode operation, the microcomputer is programmed to judge whether the mode switch is in the ON or the OFF state and to execute a self-checking mode of operation when the mode switch is in the ON state. Prior to the shipment of the controller, the microcomputer is caused to perform the self-checking mode operation by turning on the mode switch. More specifically, light-emitting diodes connected to output ports of the microcomputer are caused to light sequentially in response to instruction signals outputted from the microcomputer. Alternatively, the light-emitting diodes are turned on or turned off in accordance with either the states of switches connected to input ports of the microcomputer or the condition of inputting of analog signals to the input ports. In this case, the operator checks whether there is any malfunction by recognizing the state (ON or OFF) of the light-emitting diodes with the eyes.

In the controllers of the above-mentioned Japanese applications, the checking of a malfunction is simplified by letting the microcomputer perform a self-checking function. However, these controllers have not been satisfactory on the following points. The self-checking function of such conventional controllers is merely to output signals in accordance with the switch signals for controlling the light-emitting diodes. Thus, a final judgment of whether there is any malfunction is left to the operator. Therefore, in the case where many inputting and outputtings of the microcomputer have to be checked, there is a risk that the operator may make a mistake in the checking.

Also, the operator must set the switches, connected to the microcomputer, to the ON or the OFF state, and therefore it is possible that the operator makes an erroneous switching operation, thus failing to carry out a proper checking.

In order to prevent a runaway (unintended operation) of the microcomputer, a detection means called "watch dog timer" is used to reset the microcomputer. Such watch dog timers are disclosed, for example, in Japanese Laid-Open (Kokai) Patent Application Nos. 58-154052, 58-155243, 58-155244, 58-155245, 60-7511, 60-8445, 61-1552, 61-8440, 61-32101 and 61-202233.

SUMMARY OF THE INVENTION

It is an object of this invention to provide a system capable of checking a malfunction of a controller efficiently and accurately.

According to the present invention, there is provided a system for checking a malfunction in a controller comprising at least one input terminal, at least one output terminal, and a microcomputer connected between the input terminal and the output terminal, the system comprising:

(a) an external circuit means connectable between the input terminal and the output terminal so as to establish a predetermined relation between the voltage levels of the input and output terminals; and (b) an external display means connectable to the controller so as to display a malfunction of the controller;

(c) the microcomputer comprising means for performing a normal control mode, means for performing a self-checking mode, and means for judging whether conditions of entry into the self-checking mode are met and for selecting one of the two modes; the self-checking mode performing means of the microcomputer comprising (i) an output control means for outputting a control signal for setting the output terminal to one of high and low logic voltage levels; (ii) a malfunction judging means for judging whether an input signal passed to said microcomputer through the input terminal having the predetermined voltage relation with the output terminal has a voltage level corresponding to the voltage level of the output terminal and for judging that there is a malfunction if the input signal is not at the corresponding level; and (iii) a display control means for displaying the malfunction in the external display means when the malfunction judging means judges the malfunction.

DESCRIPTION OF THE PREFERRED EMBODIMENTS OF THE INVENTION

Figure 1:
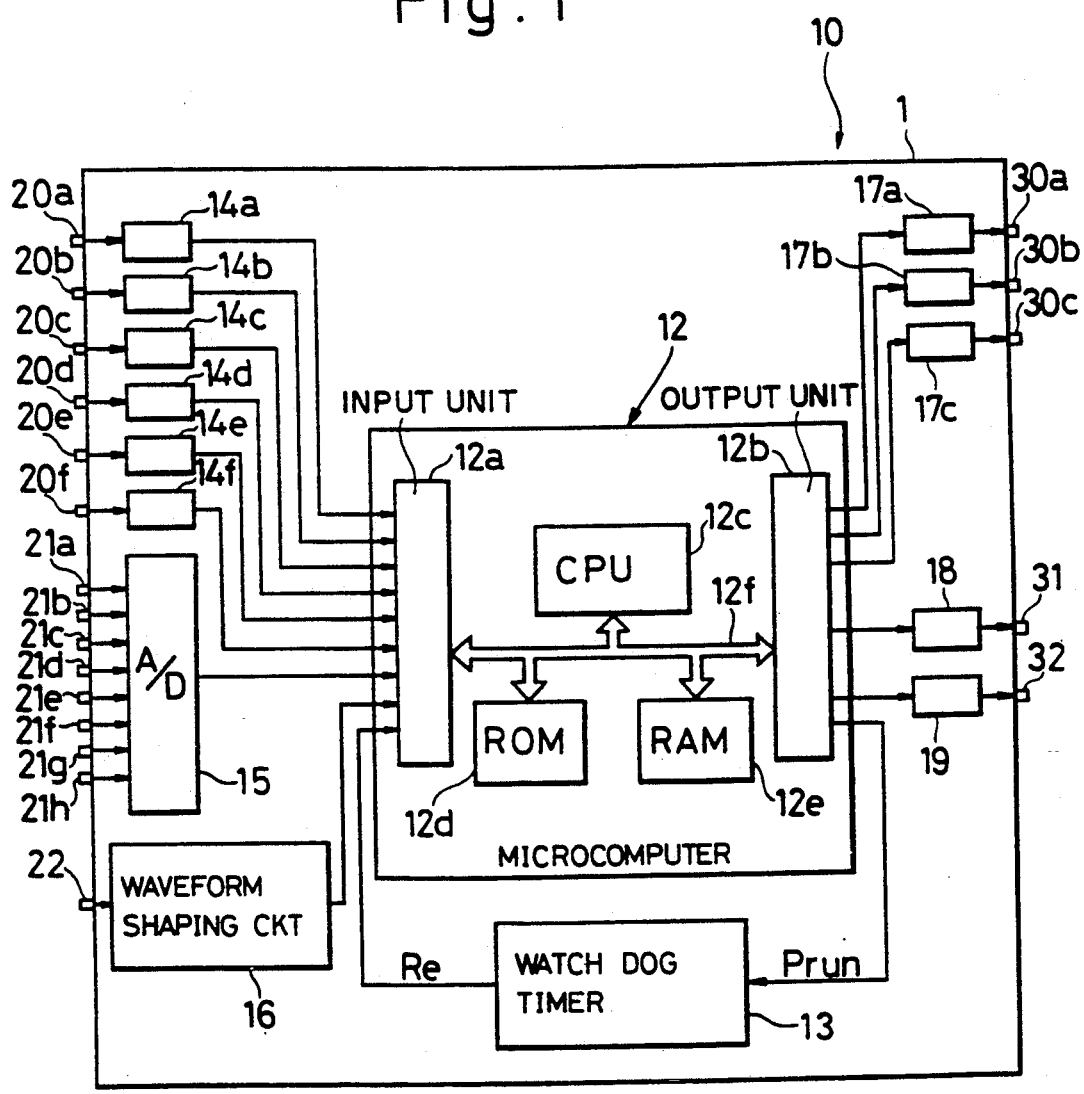
FIG. 1 a block diagram of a controller which is checked by a malfunction checking system according to the present invention.

One embodiment of the present invention will now be described with reference to FIGS. 1 to 10. FIG. 1 shows a controller 10 used, for example, for controlling a fuel injection in a diesel engine for vehicles. The controller 10 comprises a box 11, a microcomputer 12, a watch dog timer 13 (runaway detecting means), digital interfaces 14a to 14f for preventing noises and regulating voltages, an A/D (analog-to-digital) converter 15, a waveform shaping circuit 16, drive circuits 17a to 17c, 18 and 19. These components are contained within the box 11.

The microcomputer 12 basically comprises an input unit 12a, an output unit 12b, a central processing unit (CPU) 12c, a read only memory (ROM) 12d, a random access memory (RAM) 12e and a bus 12f interconnecting these components. A program is stored in the ROM 12D as later described.

The watch dog timer 13 is known in the art, and there are many types. The watch dog timer 13 here comprises, for example, contains a counter for counting clock pulses. This counter is reset when it receives from the output unit 12b of the microcomputer 12 a pulse signal Prun representative of a program run as later described. When the counter does not receive the pulse signal Prun from the microcomputer 12 and hence counts up to a predetermined value without being reset, the watch dog timer outputs a reset signal Re to the input unit 12a of the microcomputer 12 to thereby reset the microcomputer 12.

The box 11 has input terminals 20a to 20f for inputting respective signals of binary logic levels (high and low), input terminals 21a to 21h for inputting analog data, and an input terminal 22 for inputting pulses. The input terminals 20a to 20f are connected via the respective interfaces 14a to 14f to the input unit 12a of the microcomputer 12. The data input terminals 21a to 21h are connected via the A/D converter 15 to the input unit 12a of the microcomputer 12. The pulse input terminal 22 is also connected via the waveform shaping circuit 16 to the input unit 12a of the microcomputer 12.

The box 11 further includes output terminals 30a to 30c for outputting respective voltages of a high or a low level, an output terminal 31 for feeding a fuel injection control output, and an output terminal 32 for feeding a display control output. The output terminals 30a to 30c, 31 and 32 are connected to the output unit 12b via the respective drive circuits 17a to 17c, 18 and 19.

In this embodiment, the voltage levels at the input terminals 20a to 20f are different in absolute value from the voltage levels of the signals inputted to the input ports of the microcomputer 12 corresponding to the respective input terminals 20a to 20f, but the former voltage levels are equal to the latter voltage levels, respectively, in the sense of the binary logic level. In a similar sense, the voltage levels at the output terminals 30a to 30c are equal to those of signals outputted from their corresponding output ports of the microcomputer 12. The voltage levels at the input terminals 20a to 20f or the output terminals 30a to 30c may be reverse to the voltage levels at the input ports or the output ports of the microcomputer in the sense of the binary logic level.

Although not shown in the drawings, the controller 10 further includes other discrete components contained in the box 11 and other input and output terminals.

The controller 10, when mounted on a vehicle, operates in the normal control mode. The normal control mode operation will now be described. A starter switch for driving a cell motor for the diesel engine and other switches, such as one for operating an air conditioner, are connected to the respective input terminals 20a to 20f. The signals from these switches are inputted to the microcomputer 12 via the respective interfaces 14a to 14f. A potentiometer for sensing the amount of pushing of an accelerator, a temperature sensor for sensing the temperature of a coolant water for the engine, a fuel temperature sensor, a sensor for detecting the position of a control member of a fuel injection pumps and so on are connected to the respective input terminals 21a to 21h. These sensors input analog data to the input terminals 21a to 21h. These analog data are converted by the A/D converter 15 into digital data and inputted to the microcomputer 12.

A pickup sensor for detecting the engine speed is connected to the input terminal 22, and this sensor inputs pulses to the terminal 22. These pulses are formed by the waveform shaping circuit 16 into rectangular pulses and are inputted into the microcomputer 12, thus providing information for calculating the engine speed.

An actuator is connected to the output terminal 31. In the normal control mode, the microcomputer 12 calculates the optimum amount of injection of the fuel in accordance with the inputted switch signals, data, engine speed and so on to thereby output a drive signal to the drive circuit 18. The drive circuit 18 outputs to the output terminal 31 drive pulses of a duty ratio corresponding to the drive signal. In accordance with the duty ratio of the drive pulses, the above-mentioned actuator controls the position of the control member of the fuel injection pump, thereby controlling the amount of injection of the fuel from the fuel injection pump to the optimum level.

A lamp for indicating a malfunction of the system in the normal control mode, a relay for controlling the energization of a preheat plug and so on are connected to the respective control output terminals 30a to 30c, and operate under the control of the microcomputer 12.

In the normal control mode, nothing is connected to the display output terminal 32, so that it does not output any signal.

Figure 2:
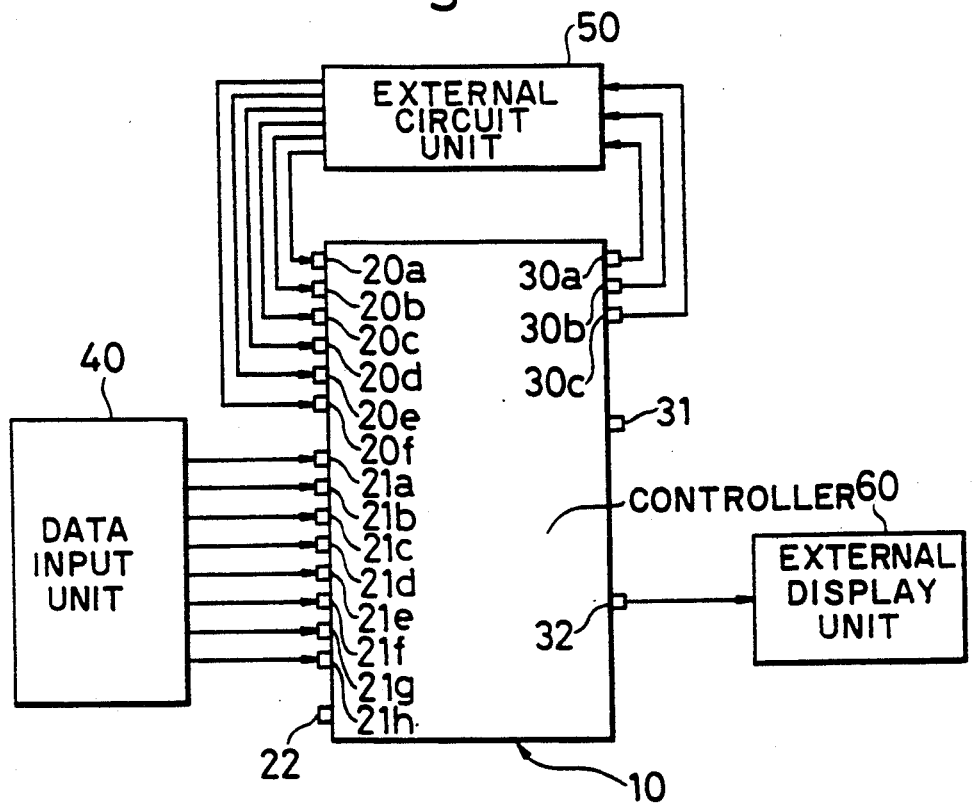
FIG. 2 is a block diagram of the malfunction checking system.

The controller 10 mentioned above is subjected to checking to judge whether there is a malfunction, for example, prior to its shipment. In this case, as shown in FIG. 2, hardwares which have nothing to do with the normal control mode operation is connected to the controller 10. More specifically, instead of the potentiometer and the sensors which are connected in the normal control mode, a data input unit 40 is connected to the data input terminals 21a to 21h of the controller 10. Also, an external circuit unit 50 is connected between the output terminals 30a to 30c and the input terminals 20a to 20f. Further, an external display unit 60 is connected to the output terminal 32. Regardless of whether the engine speed sensor is connected to the input terminal 22 or not, the checking of a malfunction is not affected. For example, the input terminal 22 is connected to ground. Also, the actuator for controlling the fuel injection may or may not be connected to the output terminal 31.

The data input unit 40 serves to judge conditions of entry of the microcomputer 12 into the self-checking mode, as later described, and to feed predetermined analog data to the respective analog signal input terminals 21a to 21h. These analog data to be fed to the respective terminals 21a to 21h are different from one another.

Figure 3:
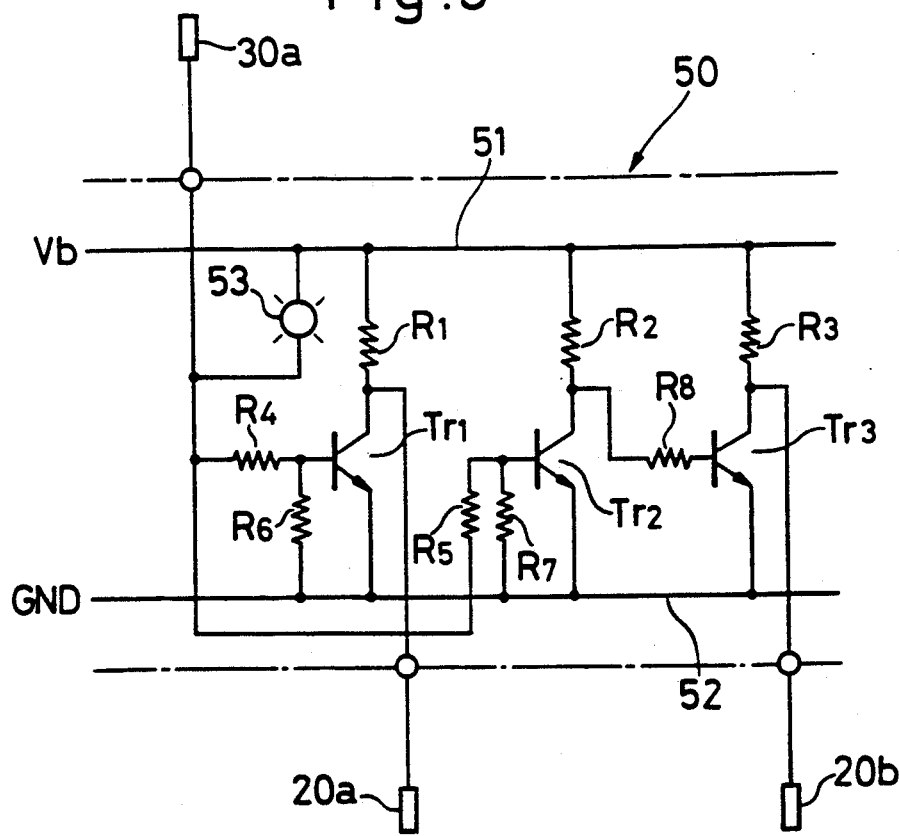
FIG. 3 is a circuit diagram of an external circuit unit of FIG. 2.

The external circuit unit 50 serves to establish a predetermined relation between the voltage level of each of the output terminals 30a to 30c and the voltage levels of each pair of the input terminals 20a to 20f. FIG. 3 shows a portion of the circuitry of the external circuit unit 50. This portion of the circuitry serves to establish the predetermined relation between the voltage level at the output terminal 30a and the voltage levels at the two input terminals 20a and 20b, and comprises three transistors Tr1 to Tr3. The collectors of the transistors Tr1 to Tr3 are connected via respective resistors R1 to R3 to a line 51 supplied with a battery voltage Vb. The emitter of each transistor is connected to a ground potential line 52. The output terminal 30a is connected via a resistor R4 to the base of the transistor Tr1 and is also connected via a resistor R5 to the base of the transistor Tr2. A resistor R6 is connected between the base and emitter of the transistor Tr1, and a resistor R7 is connected between the base and emitter of the transistor Tr2. The collector of the transistor Tr2 is connected via a resistor 8 to the base of the transistor Tr3. A lamp 53 is connected between the output terminal 30a and the power source line 51 as a simulator load. The input terminals 20a and 20b are connected to the collectors of the transistors Tr1 and Tr3, respectively.

In the external circuit unit 50, for example, when the voltage at the output terminal 30a is at the high level, the transistor Tr1 is turned on, so that the voltage at the input terminal 20a is at the low level. At the same time, the transistor Tr2 is turned on, so that the transistor Tr3 is turned off, thereby causing the voltage at the input terminal 20b to go to the high level. The reason that the voltage levels at the input terminals 20a and 20b corresponding to the output terminal 30a are different from each other is to even enable a malfunction, due to a short circuit between the terminals 20a and 20b, to be found.

The same relation as described above with reference to FIG. 3 is established between the output terminal 30b and the input terminals 20c and 20d and between the output terminal 30c and the input terminals 20e and 20f.

Figure 4:
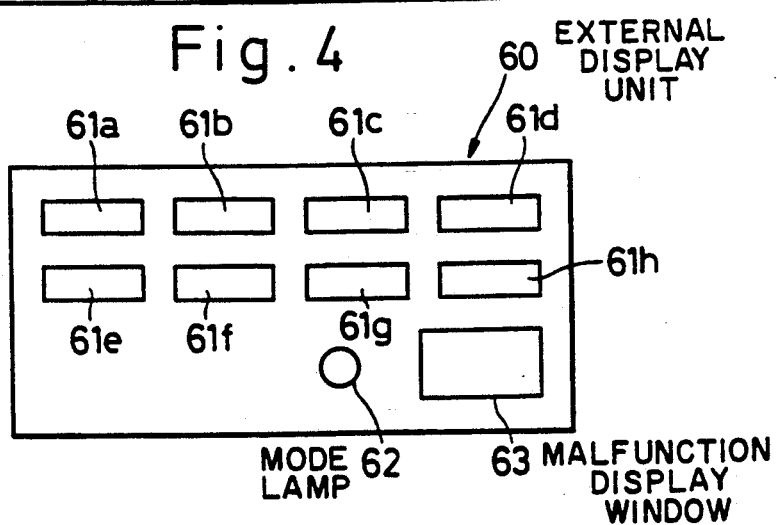
FIG. 4 is a front elevational view of an external display unit of FIG. 2.

As shown in FIG. 4, the external display unit 60 includes eight display windows 61a to 61h for displaying numerals, a mode lamp 62, and a malfunction display window 63.

In the above-mentioned connection arrangement, the microcomputer 12 executes the self-checking mode operation as later described. The microcomputer 12 has means for performing the above-mentioned normal control mode, means for performing the self-checking mode, and means for selecting one of the normal control mode and the self-checking mode, these three means being provided in the form of programs. As will be apparent from the foregoing explanation, the connection of the hardwares to the controller 10 are quite different between the normal control mode and the malfunction checking mode. In the normal control mode, the voltage levels at the output terminals 30a to 30c have nothing to do with the voltage levels at the input terminals 20a to 20f whereas in the malfunction checking mode, the predetermined relation is established by the external circuit unit 50 between each output terminal 30 and its corresponding two input terminals 20. Also, in the normal control mode, the data inputted to the input terminals 21a to 21h always vary whereas in the malfunction checking mode, the predetermined data are inputted to these input terminals. Further, in the normal control mode, pulses are inputted to the input terminal 22 whereas in the malfunction checking mode, no pulse is inputted to this input terminal. The microcomputer 12 judges some of these conditions so as to select one of the normal control mode and the self-checking mode.

The programs to be executed by the microcomputer 12 will now be described with reference to FIGS. 5 to 10. First, when the power switch ON signal or the reset signal is fed to the microcomputer 12, it executes an initializing program shown in FIG. 5. At step 100, the input and output ports are initialized. At the next step 101, it is judged whether the data in a mode check RAM (which is different from the RAM 12e) represents a first predetermined value or a second predetermined value. If the judgment indicates that the data is the second predetermined value, which means that the operation is in the normal control mode, the program proceeds to step 102 where a display pointer later described is reset. Then, a check counter later described is reset at step 103, and a malfunction display register is reset at step 104. Then, at step 105, the input unit 12a, the output unit 12b, the RAM 12e and so on are initialized, which is hereinafter referred to as "system initialization", thus finishing the program, so that the processing proceeds to a task monitor program.

If the judgment at step 101 indicates that the data of the check RAM is the second predetermined value, which means that the operation is in the self-checking mode, the processing proceeds to step 106 where it is judged whether the value of the display pointer is less than 10 or not. If the judgment indicates that this value is not less than 10, the above-mentioned processings at steps 102 to 105 are executed, because such a value is not to be obtained in the self-checking mode. On the other hand, if the judgment at step 106 indicates that the value of the display pointer is less than 10, which means that the operation is in the self-checking mode, the program proceeds to the next step 107 where it is judged whether the value of the check counter is less than 4 or not. If the judgment indicates that the value of the check counter is not less than 4, the above-mentioned processings at steps 102 to 105 are executed, because such a value is not to be obtained in the self-checking mode. On the other hand, if the judgment at step 107 indicates that this value is less than 4, which means that the operation is in the self-checking mode, the program proceeds to step 108 where a high level voltage is outputted to one output terminal 30a. Then, at step 109, it is judged whether an input signal passed through one input terminal 20a corresponding to the output terminal 30a is at the high level or the low level. If the judgment indicates that this input is at the high level, which means that the operation is not in the self-checking mode, the above-mentioned processings at steps 102 to 105 are executed. If the judgment at step 109 indicates that this input is at the low level, which means that the operation is in the self-checking mode, the program proceeds to the next step 110. At step 110, a low level signal is outputted to the output terminal 30a. Then, at step 111, it is judged whether the level of the input signal passed through the input terminal 20a corresponding to the output terminal 30a is at the high level or the low level. If the judgment indicates that this input signal is at the low level, which means that the operation is not in the self-checking mode, the above-mentioned processings at steps 102 to 105 are executed. On the other hand, if the judgment at step 111 indicates that this input signal is at the high level, which means that the operation is in the self-checking mode, the program proceeds to step 112 where the system initialization is executed, so that the processing proceeds to the task monitor program. Therefore, in the case where the self-checking mode operation is performed, the display pointer, the check counter and the malfunction display register are not reset.

When the above-mentioned initialization program is finished, a task operating signal is generated by the task monitor program, so that the task (TASK 1) of the shortest operating cycle shown in FIGS. 6 to 9 is executed. First, at steps 120 to 126, it is judged whether the conditions of entry into the self-checking mode are met so as to select one of the normal control mode or the self-checking mode. More specifically, at step 120, it is judged whether the engine speed is zero or not. As described previously, when checking a malfunction, the pulse signal is not inputted to the input terminal 22, so that the value of the engine speed calculated based on this pulse signal is zero. Therefore, if the judgment at step 120 indicates that the value representative of the engine speed is not zero, which means that the normal control mode operation is being performed, the program proceeds to step 121 where the second predetermined value representative of the normal control mode is stored in the check RAM, thus finishing the task TASK 1, so that the processing proceeds to the task monitor program.

If the judgment at step 120 indicates that the engine speed is zero, which means that one of the conditions of entry into the self-checking mode is met, it is judged at the next step 122 whether the inputted analog data substantially coincide with their respective predetermined values. If the judgment indicates that at least one of these inputted data does not coincide with its predetermined value, which is considered either that the A/D converter 15 is subjected to a malfunction or that the operation is in the normal control mode, the program proceeds to step 121, and then the task TASK 1 is finished.

Figure 5:
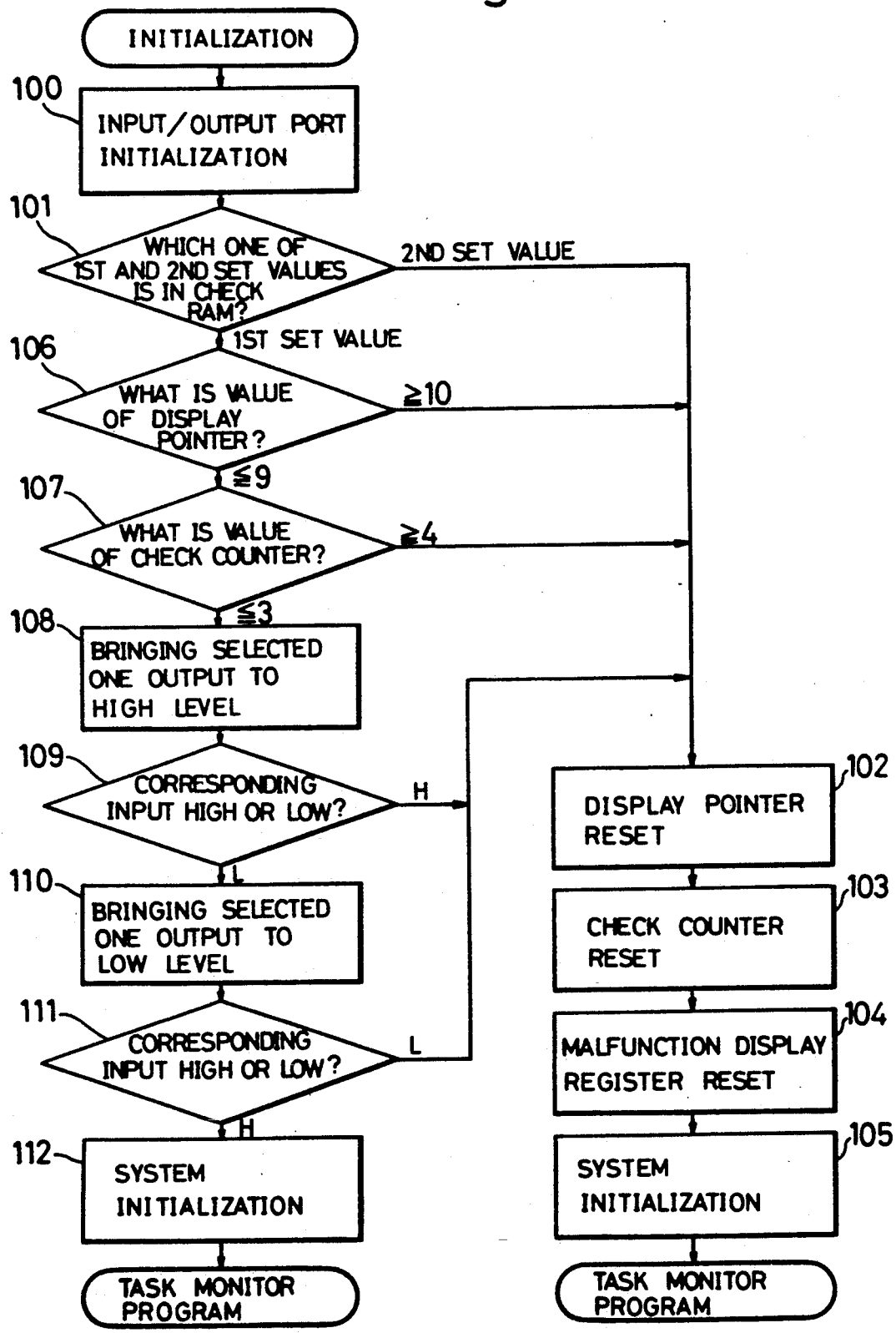
FIG. 5 is a flow chart of a program to be executed by a microcomputer in response to either the turning-on of a power switch or the inputting of a reset signal.
Figure 6:
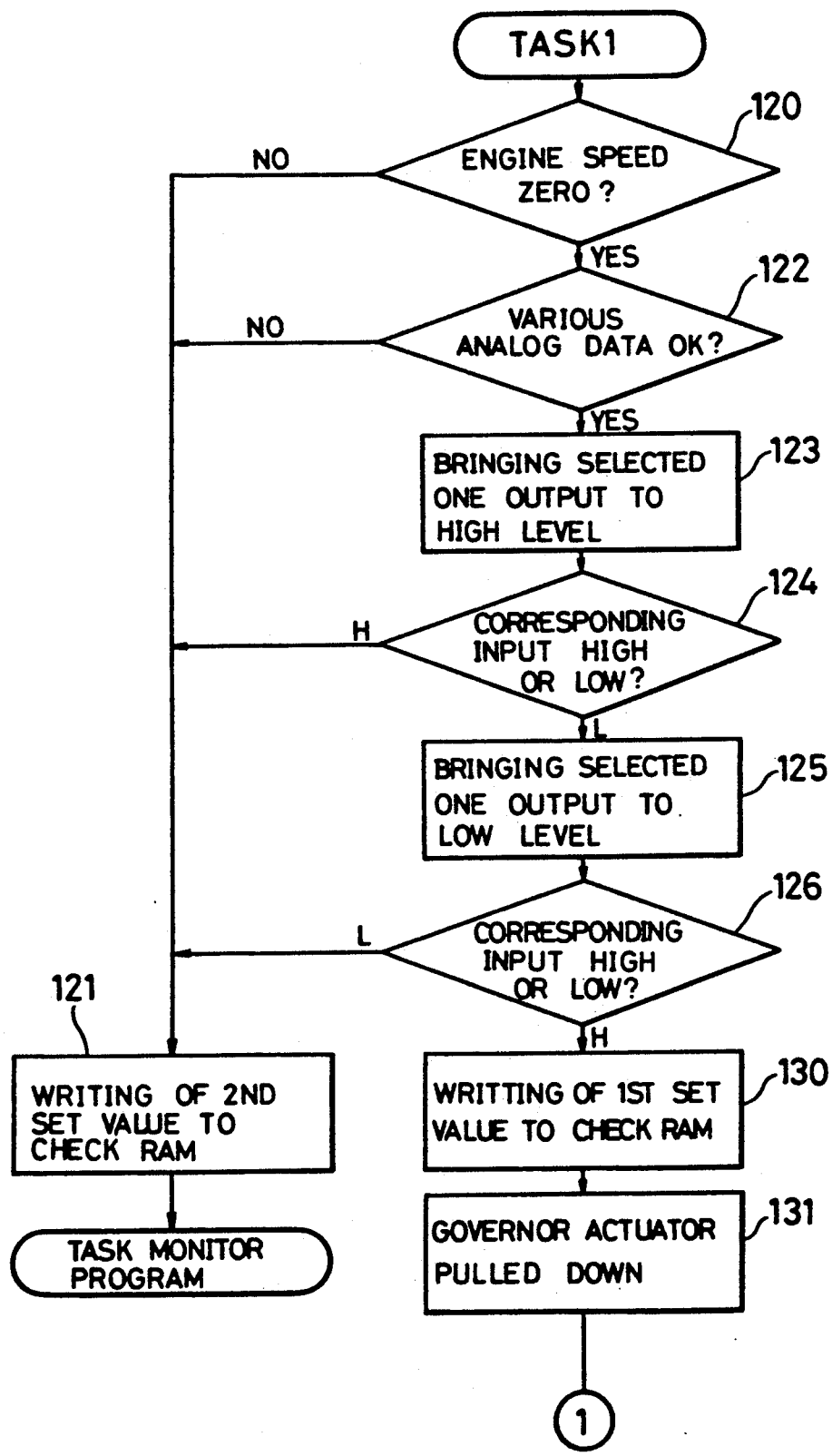
FIGS. 6 to 9 are flow charts showing divisions of a task of the shortest operating cycle executed by the microcomputer.

If the judgment at step 122 indicates that all the inputted analog data coincide with their respective predetermined values, which means that another condition of entry to the self-checking mode is met, the program proceeds to steps 123 to 126 where the same processings as in steps 108 to 111 of FIG. 5 are carried out and therefore will not be described here in detail. At each of steps 124 and 126, if the judgment indicates that the input levels do not corresponds to the output level, the processing proceeds to step 121, and then the task TASK 1 is finished.

When the task TASK 1 is finished as described above, then task TASK 2 (FIG. 10) having a longer operating cycle than that of the task TASK 1 is executed. In the task TASK 2, the normal control is executed at step 200, and at step 201, a pulse representative of the program run is outputted. This cycle of processing is repeated. Since the normal control is well known, the task TASK 2 will be quite briefly described here, and many steps of the program are shown as combined into one step 200. At step 201, the watch dog timer 13 is reset by the program run signal Prun, so that this timer does not feed the reset signal Re to the microcomputer 12. Therefore, during the normal control, the microcomputer 12 is not reset, so that the normal control is carried out in a stable manner.

If the conditions of entry into the above-mentioned self-checking mode are not met even when checking a malfunction, the microcomputer 12 will carry out the normal control mode. In this case, the activation or lighting of the mode lamp 62 and the displaying of the data in the numeral display windows 61a to 61h are not done although such activation and displaying are to be done in the self-checking mode as later described. Therefore, when the mode lamp 62 is kept in its deactivated condition, with no numeral displayed in the numeral display windows 61a to 61h, the operator can surmise that there is at least one malfunction such as an improper connection between the input terminals 21a to 21h and the A/D converter 15, an improper connection between the A/D converter 15 and the microcomputer 12, a malfunction of the A/D converter itself, and an improper connection between the output and input terminals 30a, 20a and the microcomputer 12. At both steps 124 and 126 mentioned above, if it is judged that the input levels correspond to the output level, which means that all the conditions of entry into the self-checking mode are met, the program proceeds to step 130 where the first predetermined value representative of the self-checking mode is loaded into the check RAM. Then, at step 131, a control signal is outputted from the microcomputer 12 to the output terminal 31 so as to cause the governor actuator to pull down the control member of the fuel injection pump to thereby stop the engine. This is to stop the vehicle when the program runs away and unintentionally enters the self-checking mode during the normal control operation.

In the case where the governor actuator is connected to the output terminal 31 when the malfunction checking is carried out, the operator can ascertain with the eyes whether the control member is pulled down, thus judging whether the connection between the output terminal 31 and the microcomputer 12 is proper. This connection may be checked by detecting the voltage at the output terminal 31.

Figure 7:
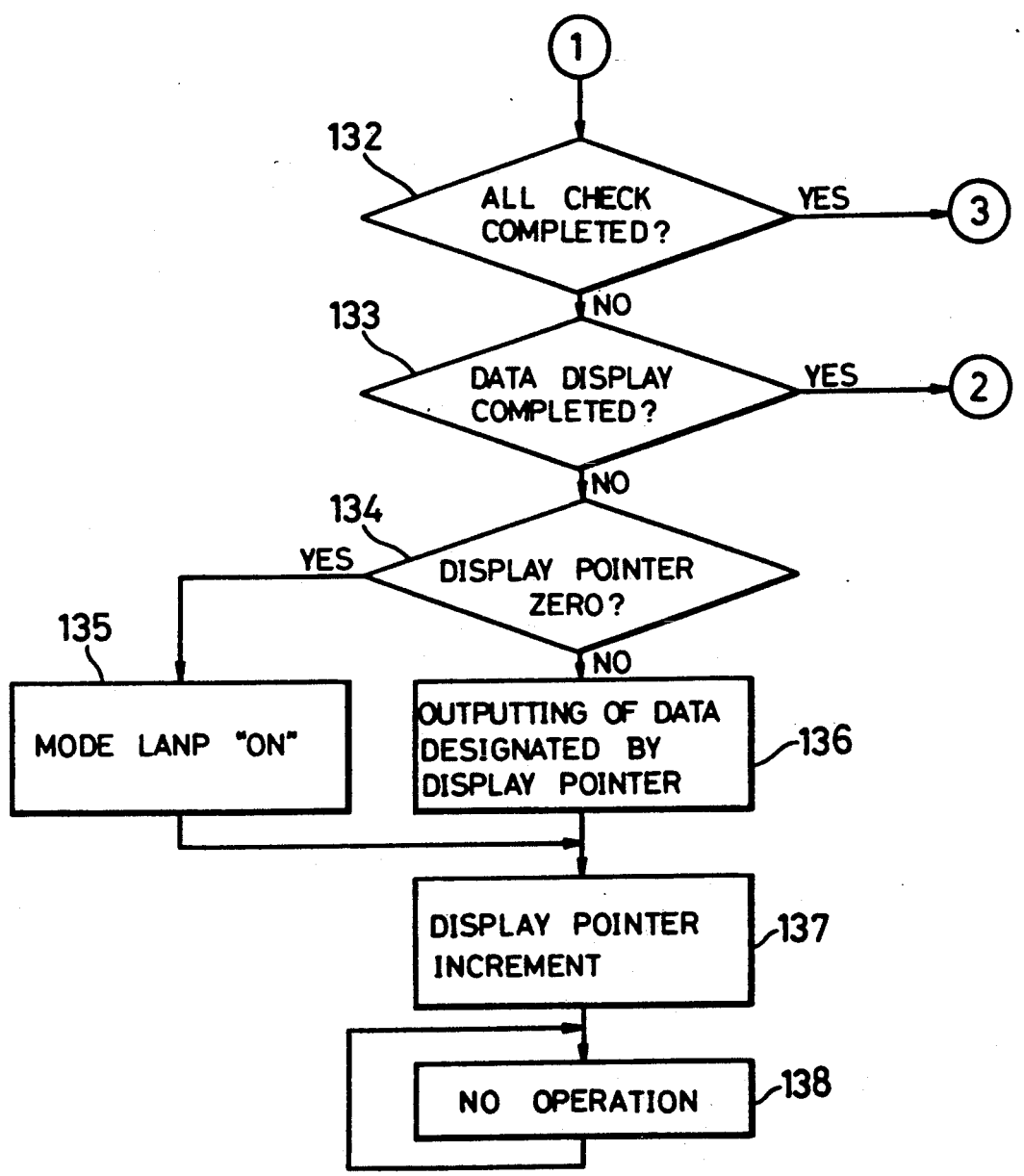
Figure 8:
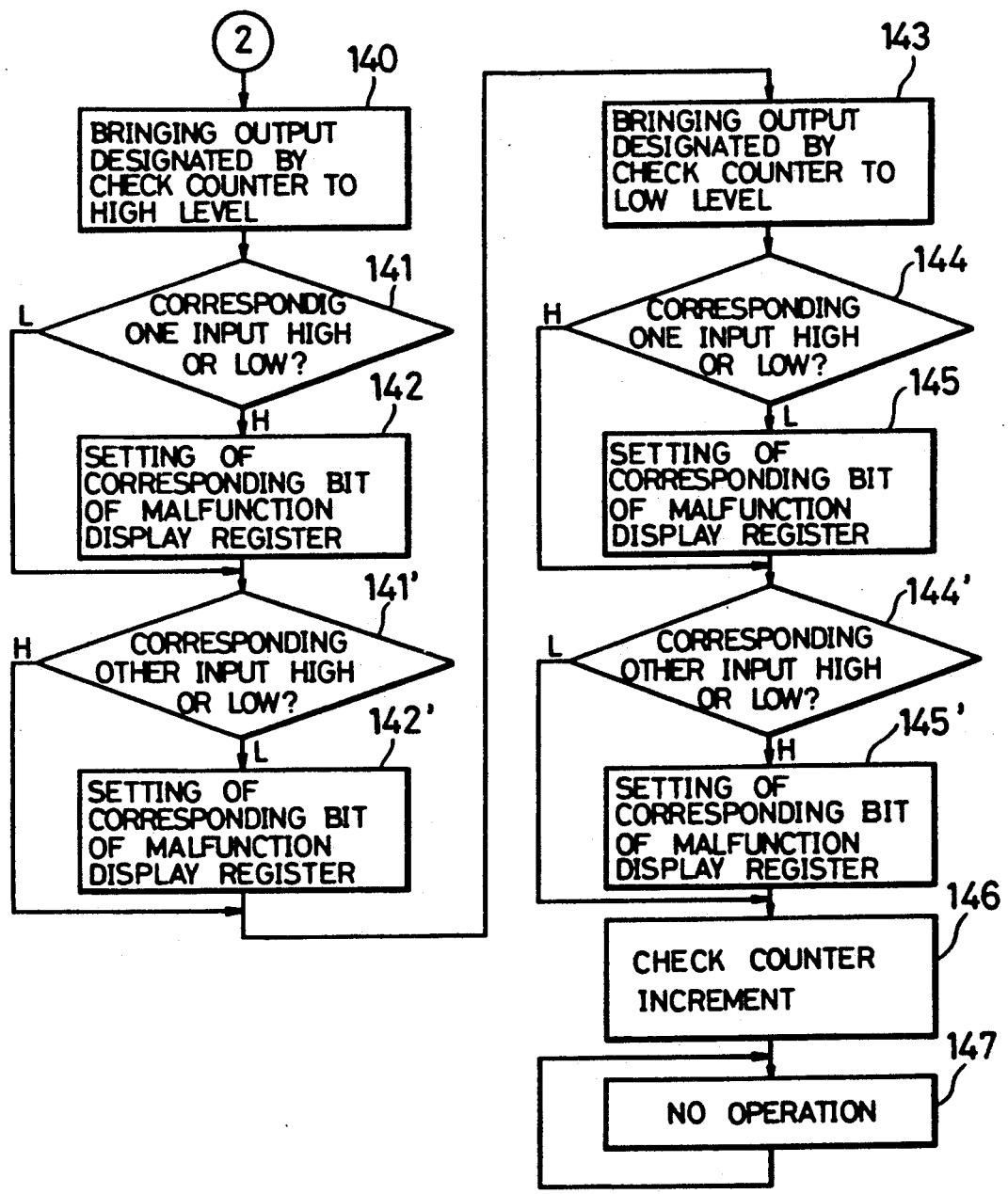
Figure 9:
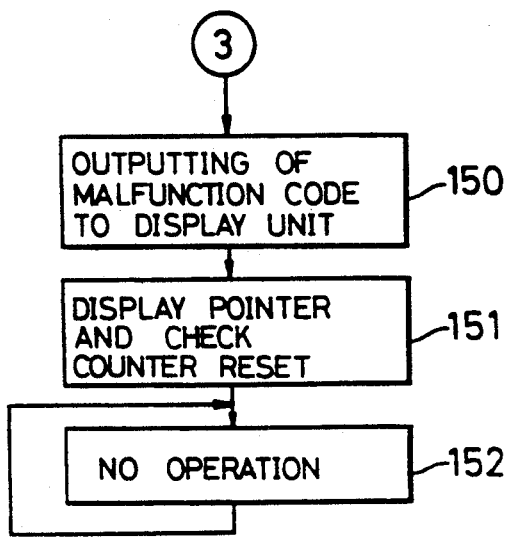
Figure 10:
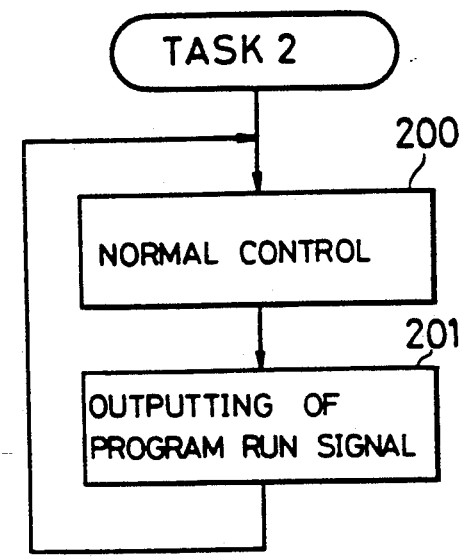
FIG. 10 is a flow chart of a task for the normal control mode.

After step 131, the self-checking mode shown in FIGS. 7 to 9 is executed. First, at step 132 of FIG. 7, it is judged whether all the checkings of the relations between the respective corresponding outputs and inputs are finished, that is, whether the value of the check counter is equal to the number (i.e., "3") of the control output terminals 30a to 30c.

If the judgment at step 132 indicates that all the checkings have not yet been finished, the program proceeds to step 133 where it is judged whether the display of the data in the numeral display windows 61a to 61h has been finished, that is, whether the value of the display pointer is "9". If the judgment indicates that this display has not yet been finished, the processings at the subsequent steps 134 to 138 are performed. At these steps 134 to 138, the mode lamp 26 is lit, and the data are sequentially displayed in the numeral display windows 61a to 61h of the external display unit 60. More specifically, at step 134, it is judged whether the value of the display pointer is zero. If the judgment indicates that the value is zero, the mode lamp 62 is lit at step 135. Thus, from the beginning of the execution of the self-checking mode, this execution is indicated by the lighting of the mode lamp 62. If the judgment at step 134 indicates that the value of the display pointer is not zero, one of the data outputted from the input unit 40 to the input terminal 20 corresponding to the value of the display pointer is displayed in the corresponding one of the numeral display windows 61a to 61h. After step 135 or step 136, the display pointer is incremented by 1 at step 137.

At the next step 138, no processing is performed (no operation), and step 138 is repeated to form an infinite loop. Therefore, the program run signal Prun is not outputted, so that the microcomputer 12 waits for the reset signal Re from the watch dog timer 13. Therefore, each time the data is displayed in a respective one of the numeral display windows, the microcomputer 12 is reset. After the microcomputer 12 is reset, the processing proceeds through the above-mentioned steps 100, 101, 106 to 112 (FIG. 5), steps 120, 122 to 131 (FIG. 6), steps 132 and 133 (FIG. 7) again to steps 134 to 138. This processing is repeated. As a result, the data are sequentially displayed in the respective numeral display windows 61a to 61h.

When the above data display is finished, the value of the display pointer becomes "9". If the judgment at step 133 indicates that the value of the display pointer is equal to "9", the processing proceeds to steps 140 to 147 shown in FIGS. 8. More specifically, at step 140, a high level signal is outputted to one of the output terminals 30a to 30c designated by the check counter. When the value of this counter is "0", the output terminal 30a is designated, and when the value is "1", the output terminal 30b is designated, and when the value is "2", the output terminal 30c is designated. Then, at step 141, it is judged whether one of that pair of input terminals corresponding to the designated output terminal (for example, the input terminal 20a if the output terminal 30a is designated) is at the high or the low level. If the judgment indicates that the one input terminal is at the high level, which means that there is a malfunction, the program proceeds to step 142 where a bit of the malfunction display register corresponding to the one input terminal is set. On the other hand, if it is judged at step 141 that the one input terminal is at the low level, the program skips step 142. At the next step 141', it is judged whether the other of the pair of input terminals corresponding to the designated output terminal (the input terminal 20b if the output terminal 30a is designated) is at the high or the low level. If the judgment indicates that the other input terminal is the low level, which means that there is a malfunction, the program proceeds to step 142' where a bit of the malfunction display register corresponding to the other input terminal 20b is set. On the other hand, if the judgment at step 141' indicates that the other input terminal is at the high level, the program skips step 142'.

Next, at step 143, a signal of the low level is inputted to the above-mentioned output terminal designated by the check counter. The processings at steps 144 to 145' are similar to the above-mentioned processings at steps 141 to 142' and therefore will not be described in detail. At each of steps 144 and 144', if it is judged that the predetermined voltage level relation between the designated output terminal and each of the corresponding input terminals is not established, the program proceeds to a respective one of steps 145 and 145' where a bit of the malfunction display register corresponding to each input terminal is set.

At the next step 146, the check counter is incremented by 1. At the next step 147, no processing is made (no operation), and this step 147 is repeated to form an infinite loop. Therefore, the program run signal Prun is not outputted, so that the microcomputer 12 waits for the reset signal Re from the watch dog timer 13. Therefore, each time the input/output checking is carried out with respect to each of the control output terminals 30a to 30c, the microcomputer 12 is reset. After the microcomputer 12 is reset, the program proceeds through the above-mentioned steps 100, 101, 106 to 112 (FIG. 5), 120, 122 to 131 (FIG. 6), 132 and 133 (FIG. 7) again to steps 140 to 146. This processing is repeated. As a result, the voltage level relations between the respective output terminals 30 and input terminals 20 are sequentially checked.

When all these checkings of the voltage level relations are finished, the value of the check counter becomes "3". If the judgment at step 132 indicates that this value is "3", the program proceeds to steps 150 to 152 of FIG. 9. More specifically, at step 150, a malfunction code signal representative of the set or reset bits of the malfunction display register is outputted to the drive circuit 19 of the external display unit 60, so that the malfunction code is displayed in the malfunction display window 63. If there is no malfunction, the malfunction code "00" is displayed. On the other hand, if there is any abnormal voltage level relation between the corresponding output and input terminals, the displayed malfunction code represents one of "01" to "06" depending on the portion suffering from such a malfunction. From the displayed malfunction code, the operator can roughly predict the portion which suffers from such a malfunction. For example, if the malfunction code represents "01", it is surmised that there is a malfunction in the connection between the input terminal 20a and the microcomputer 12, or the connection between the microcomputer 12 and the output terminal 30a, or a discrete element in these connections. If there are a plurality of malfunctions, a corresponding number of malfunction codes may be displayed. Alternatively, the malfunction code may represent other different numbers.

At the next step 151, the display pointer and the check counter are reset. At step 152, no processing is made (no operation), and this step 152 is repeated to form an infinite loop, so that the microcomputer 12 waits for the reset signal Re from the watch dog timer 13.

As is clear from the foregoing description, when checking a malfunction, the operator does not need to perform any manipulation and has only to confirm the display results. Therefore, the malfunction checking operation can be carried out more efficiently and more accurately.

If the operation unintentionally enters the self-checking mode due to noises or the like during the time when the the normal control mode operation is being performed, the infinite loop of "no operation" is formed in any one of steps 138, 147 and 152, so that the microcomputer waits for the reset signal Re. And, when the microcomputer is reset, the program of FIG. 5 is executed, and then at step 120, 122, 124 or 126, it is judged that each condition of entry into the self-checking mode is not met, thus selecting the normal control mode, so that the operation escapes from the self-checking mode positively and rapidly.

"No operation" may be maintained to wait for the reset signal Re after all the steps of the self-checking program is completed.

Figure 11:
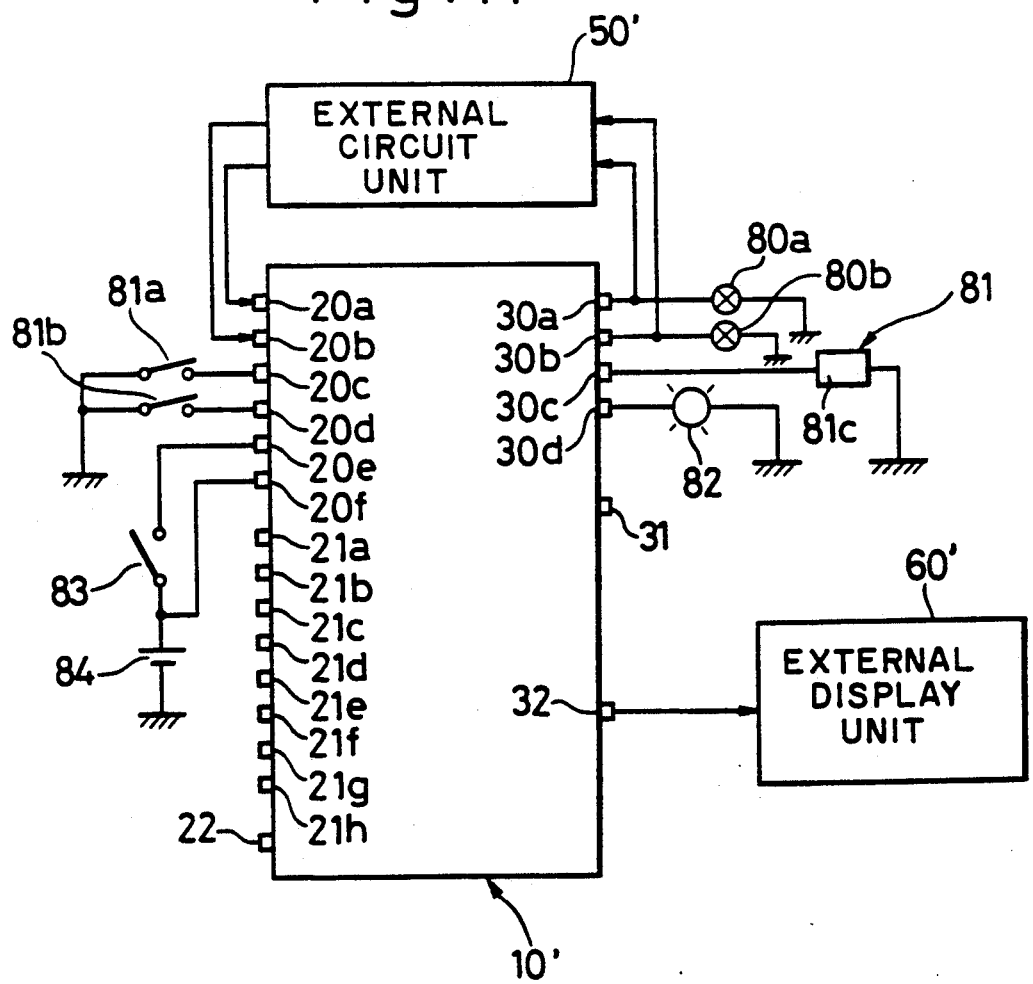
FIG. 11 a view similar to FIG. 2 but showing a modified form of the invention.

FIG. 11 shows a modified form of the invention in which parts corresponding to those in FIG. 2 are denoted by the same reference numerals or like numerals and will not be explained in detail here. An external circuit unit 50' serves to correspond the voltage levels of a pair of input terminals 20a and 20b with the voltage levels of a pair of output terminals 30a and 30b, respectively. In the external circuit unit 50', the connection between the output terminal 30a and the input terminal 20a as well as the connection between the output terminal 30b and the input terminal 20b is made by either the transistor Tr1 and associated resistors shown FIG. 3 or the transistors Tr2, Tr3 and associated resistors shown in FIG. 3. Alternatively, the output terminals 30a and 30b may be connected respectively to the input terminals 20a and 20b only by electric wires. Connected respectively to the output terminals 30a and 30b are electromagnetic valves 80a and 80b which are used in the normal control mode. A coil 81c of a relay 81 is connected to an output terminal 30c. For example, the relay 81 serves to operate a feeder circuit for operating the actuator to move a butterfly valve in an exhaust manifold. When checking a malfunction, the relay 81 serves as a part of the external circuit means to establish a predetermined relation between the output terminal 30c and the input terminals 20c and 20d. More specifically, normally-open contacts 81a and 81b of the relay 81 are connected to the input terminals 20c and 20d, respectively.

Connected to an output terminal 30d is a lamp 82 which is used in the normal control mode. A battery 84 serving as a power source of a controller 10' is connected to an input terminal 20f. The battery 84 is connected to an input terminal 20e via a mode switch 83.

Figure 12:
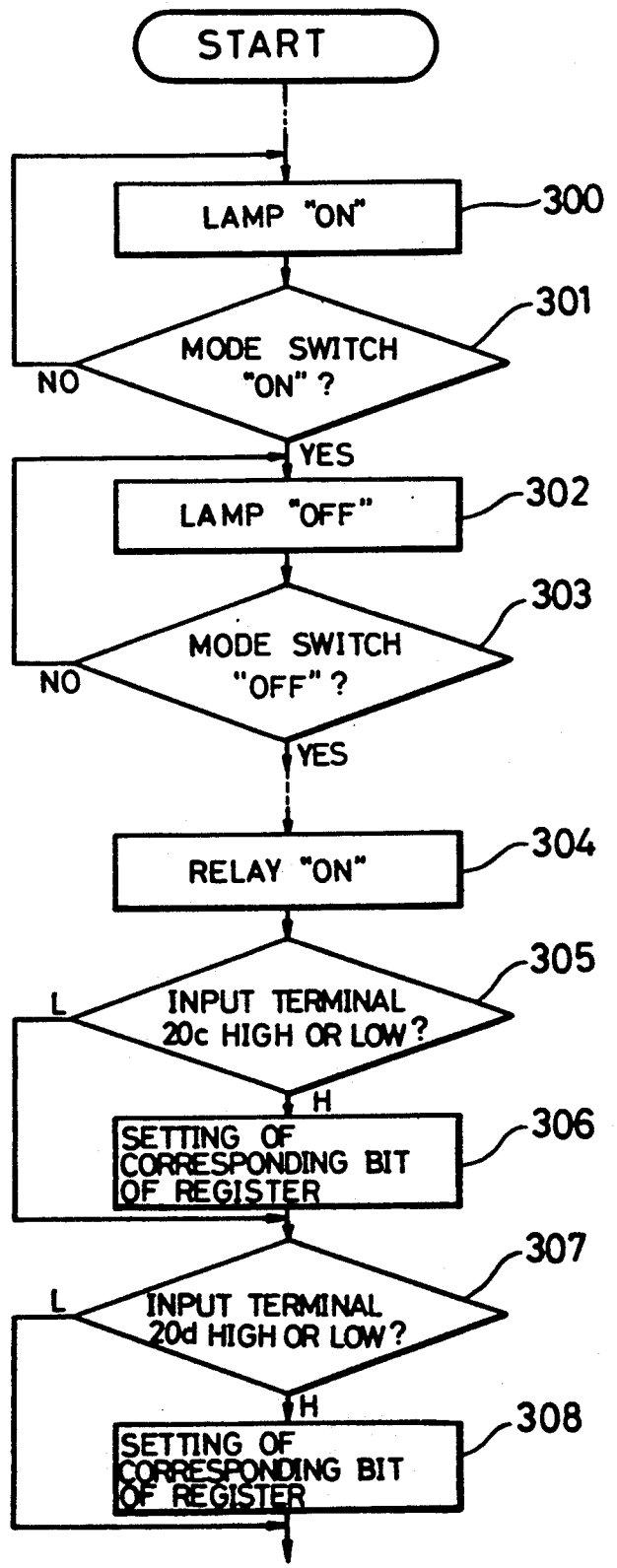
FIG. 12 is a flow chart of a program to be executed by a microcomputer of FIG. 11.

In the above-mentioned construction, the mode switch 83 is held in its closed condition in the normal control mode. When checking a malfunction, the mode switch 83 is switched from its closed to open condition. Upon switching the mode switch 83 from its closed to open condition, a switching signal is fed to the microcomputer 12 whereupon the microcomputer starts the execution of a program shown in FIG. 12. In this program, first, steps (not shown) similar to steps 123 to 126 are executed. Then, steps 300 to 303 are executed. More specifically, at step 300, the lamp 82 is lit, and at the next step 301, it is judged whether the mode switch 83 is in its closed condition. If the judgment indicates that the mode switch 83 is not closed, the program returns to step 300. As mentioned above, the program of FIG. 12 is started when the mode switch 83 is opened, and therefore steps 300 and 301 are repeated until the mode switch 83 is manipulated into its open condition. When the operator recognizes the lighting or activation of the lamp 82, the operator turns on or closes the mode switch 83. This turning-on is judged at step 301, so that the program proceeds to the next step 302 where the lamp 82 is deactivated. At the next step 303, it is judged whether the mode switch 83 is in its open condition. So long as the mode switch 83 is kept in its closed condition, steps 302 and 303 are executed repeatedly as described above for steps 300 and 301. When the operator recognizes the deactivation of the lamp 82, the operator turns off the mode switch 83. This turning-off is judged at step 303, so that the program proceeds to the next steps (not shown). In these next steps, the predetermined voltage level relations between the output terminal 30a (30b) and the input terminal 20a (20b) are checked. These steps are similar to steps 140 to 142 of FIG. 8 described above and therefore will not be described here.

Then, at step 304, the relay 81 is turned on to close the contacts 81a and 81b. At the next step 305, it is judged whether the voltage level at the input terminal 20c is high or low. If the judgment indicates that the level is high, which means that there is a malfunction, the program proceeds to step 306 where a bit of a register corresponding to the input terminal 20c is set. In contrast, if the judgment at step 305 indicates that the level is low, the program skips step 306. Similarly, at step 307, it is judged whether the level at the input terminal 20d is high or low. If the judgment indicates that the level is high, the program proceeds to step 308 where a bit of the register corresponding to the input terminal 20d is set. In contrast, if the judgment at step 307 indicates that the level is low, the program skips step 308. Thereafter, at steps (now shown) the outputting of the malfunction code to the external display unit 60' is performed as described above in step 150 of FIG. 9.

While the malfunction checking systems according to the present invention have been specifically shown and described herein, the invention itself is not to be restricted to the exact showings of the drawings and the description thereof. In the controller, some of the input terminals and output terminals may be connected directly to the microcomputer, that is, without discrete components interposed therebetween.

What is claimed is:

1. A system for checking a malfunction in a controller, comprising:
   (a) a microcomputer, said microcomputer comprising means for performing a normal control mode, means for performing a self-checking mode, and means for judging whether the normal control mode or the self-checking mode is to be performed;
   (b) a reset means being connected to said microcomputer;
   said reset means refraining from outputting a reset signal during the time when said reset means is being supplied with a program run signal from said microcomputer; said reset means outputting said reset signal to said microcomputer so as to reset said microcomputer when said reset means does not receive said program run signal for a predetermined period of time; said normal mode performing means of said microcomputer including means for outputting said program run signal; said self-checking mode performing means including means for maintaining a no-operation condition at a final stage so as to wait for the reset signal from said reset means; and each time said microcomputer is reset in response to the reset signal said judging means first judges whether the normal control mode or the self-checking mode is to be performed.

2. A system for checking a malfunction in a controller, comprising:
   (a) at least one input terminal;
   (b) at least one output terminal;
   (c) an external circuit means being connectable between said input terminal and said output terminal so as to establish a predetermined relation between the voltage levels of said input and output terminals;
   (d) an external display means being connectable to said controller;
   (e) a microcomputer being connected between said input terminal and said output terminal; said microcomputer comprising;
      i) means for performing a normal control mode,
      ii) means for performing a self-checking mode, said self-checking mode performing means comprising an output control means for outputting a control signal for setting said output terminal to one of high and low logic voltage levels; a malfunction judging means for judging whether an input signal passed to said microcomputer through said input terminal having the predetermined voltage relation with said output terminal has a voltage level corresponding to the voltage level of said output terminal and for judging that there is a malfunction if said input signal is not at said corresponding level; and a display control means for displaying said malfunction in said external display means when said malfunction judging means judges said malfunction, and iii) means for judging whether conditions of entry into the self-checking mode are met and for selecting one of said two modes; and (f) a reset means being connected to said microcomputer; said reset means refraining from outputting a reset signal during the time when said reset means is being supplied with a program run signal from said microcomputer; said reset means outputting said reset signal to said microcomputer so as to reset said microcomputer when said reset means does not receive said program run signal for a predetermined period of time; said normal mode performing means of said microcomputer including means for outputting said program run signal; said self-checking mode performing means including means for maintaining a no-operation condition at a final stage so as to wait for the reset signal from said reset means; and each time said microcomputer is reset in response to the reset signal said entry judging and mode selecting means first performs the entry judgment and the mode selection.

3. A system according to claim 2, in which said controller comprises a plurality of said input terminals and a plurality of said output terminals, said external circuit means is so constructed that there are provided a plurality of groups each comprising at least one said input terminal and at least one output terminal having the predetermined voltage level relation with each other.

4. A system according to claim 3, in which said external circuit means has at least one transistor relative to at least one pair of said input and output terminals, said transistor being switched from one of its ON and OFF states to the other in accordance with the voltage level of said output terminal, thereby controlling the voltage level of said input terminal.

5. A system according to claim 3, in which said external circuit means establishes the predetermined voltage level relation between one said output terminal and two said input terminals; said external circuit means including means for inverting a logic level voltage of said output terminal and supplying said inverted logic level voltage to one of said two input terminals, and means for supplying the other of said two input terminals with the same logic level voltage as that of said output terminal.

6. A system according to claim 3, in which said external circuit means comprises a relay having a coil and a contact, said coil being connected to said output terminal while said contact is connected to said input terminal.

7. A system according to claim 3, in which said entry judging and mode selecting means of said microcomputer has means for checking the predetermined voltage level relation between said input and output terminals so as to judge whether the conditions of entry into the self-checking mode are met.

8. A system according to claim 3, in which said controller further includes analog data input terminals and an A/D converter connected between said analog data input terminals and said microcomputer; there being provided an analog data input unit for inputting predetermined analog data to said analog data input terminals, respectively; said entry judging and mode selecting means having means for judging whether analog input data actually inputted to said analog data input terminals substantially coincide with said predetermined analog data, respectively, so as to judge whether the conditions of entry to the self-checking mode are met.

9. A system according to claim 3, in which said output control means of said self-checking mode performing means outputs a first control signal for setting said output terminal to one of high and low logic voltage levels and a second control signal for setting said output terminal to the other of the high and low logic voltage levels, said malfunction judging means judging whether the input signal passed through said input terminal has said corresponding voltage level when each of the first and second control signals is outputted to said output terminal.

10. A system according to claim 3, in which said external display means includes a mode display portion, said microcomputer including means for outputting a control signal for causing said mode display means to display the entry into the self-checking mode in said mode display portion when said entry judging and mode selecting means judges that the conditions of entry into the self-checking mode are met.

11. A system according to claim 3, in which said external display means includes a malfunction display portion; said display control means of said microcomputer having means for feeding information, representative of a location of a malfunction, to said external display means when it is judged that the predetermined voltage level relation is not established between said input and output terminals, so that said malfunction display portion displays said location of the malfunction.

* * * * *